(12) United States Patent  
Bader et al.

(10) Patent No.: US 8,564,601 B2  
(45) Date of Patent: Oct. 22, 2013

(54) PARALLEL AND VECTORED GILBERT-JOHNSON-KEERTHI GRAPHICS PROCESSING

(75) Inventors: Aleksey A. Bader, NGR (RU); Mikhail Smelyanskiy, San Francisco, CA (US); Jatin Chhugani, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 968 days.

(21) Appl. No.: 12/645,892

(22) Filed: Dec. 23, 2009

(65) Prior Publication Data

US 2011/0153996 A1    Jun. 23, 2011

(51) Int. Cl.  
*G06T 1/00* (2006.01)
(52) U.S. Cl.  
USPC .......................................................... 345/522
(58) Field of Classification Search  
USPC .......................................... 345/522; 712/204  
See application file for complete search history.

(56) References Cited

U.S. PATENT DOCUMENTS

| | | | |
|---|---|---|---|
| 5,596,686 A * | 1/1997 | Duluk, Jr. | 345/422 |
| 7,197,625 B1 | 3/2007 | van Hook et al. | |
| 7,961,194 B2 * | 6/2011 | Bakalash et al. | 345/505 |
| 2006/0149516 A1 * | 7/2006 | Bond et al. | 703/6 |
| 2007/0250683 A1 | 10/2007 | van Hook et al. | |
| 2008/0034023 A1 * | 2/2008 | Nagano | 708/100 |
| 2008/0052693 A1 | 2/2008 | Archambault et al. | |
| 2009/0144529 A1 | 6/2009 | Eichenberger et al. | |

OTHER PUBLICATIONS

British Patent Office, Combined Search & Examination Report issued in corresponding GB Application No. GB1020736.3, dated Apr. 8, 2011, 8 pgs.

* cited by examiner

*Primary Examiner* — Hau Nguyen  
(74) *Attorney, Agent, or Firm* — Trop, Pruner & Hu, P.C.

(57) ABSTRACT

Parallel and vectored data structures may be used in a single instruction multiple data processor that applies the Gilbert-Johnson-Keerthi algorithm. As a result, the performance of multi-core processors doing graphics processing may be increased in some cases.

20 Claims, 4 Drawing Sheets

US 8,564,601 B2

PARALLEL AND VECTORED GILBERT-JOHNSON-KEERTHI GRAPHICS PROCESSING

BACKGROUND

This relates generally to graphics processing. Graphics processing is the processing of electronic data for its display on a display screen, such as a computer monitor or television.

The Gilbert-Johnson-Keerthi (GJK) algorithm was invented by Elmer G. Gilbert, Daniel W. Johnson, and S. Sathiya Keerthi in 1988. See Gilbert, E. G. et al. "A Fast Procedure for Computing the Distance Between Complex Objects in Three Dimensional Space," IEEE Journal of Robotics and Automation, Vol. 4, Issue 2, April 1988, pages 199-203.

The GJK algorithm determines the minimum distance between two convex sets. A convex set is basically a depiction of an object. The GJK algorithm uses a Minkowski sum of the two convex shapes. The smooth algorithm modifications obtain the closest pair of points for two convex sets A and B.

DETAILED DESCRIPTION

Figure 1:
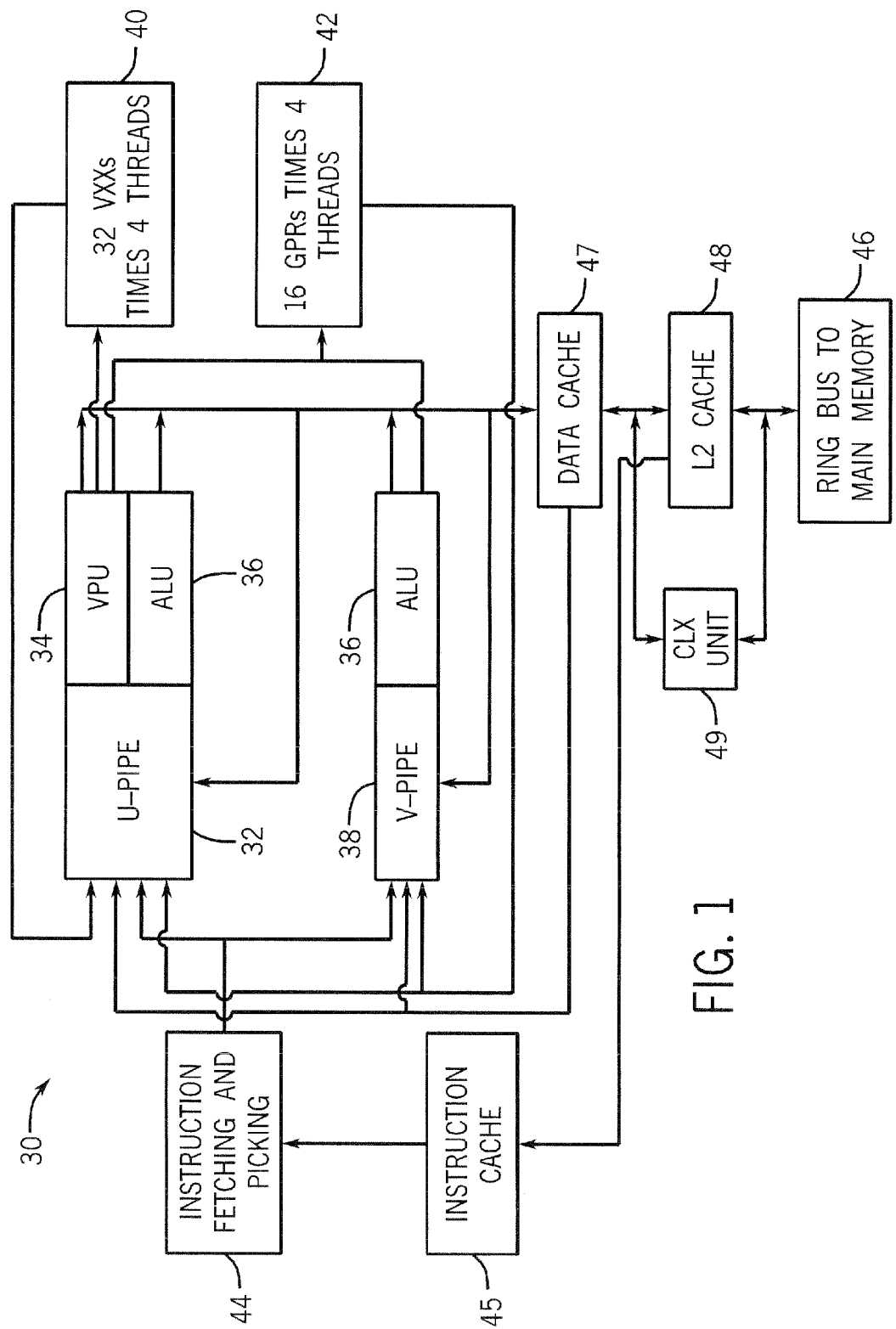
FIG. 1 is a schematic depiction for one embodiment of the present invention.

Referring to FIG. 1, a graphics processor core 30 may include a U-pipe 32 and V-pipe 38. The U-pipe 32 is coupled to a vector processing unit (VPU) 34 and an arithmetic logic unit (ALU) 36. The vector processing unit 34 is coupled to general purpose registers (GPRs) 42 (e.g. sixteen general purpose registers times four threads) and vector registers (VXXs) 40 (e.g. thirty two vector registers times four threads). The hardware registers need not be large enough to capture the total data structure in some embodiments.

The V-pipe 38 is coupled to an arithmetic logic unit 36 and the 32 vector registers 40 of sixteen general purpose registers 42. The input to the U-pipe 32 and the V-pipe 38 comes from a data cache 47 and an instruction cache 45 that feeds an instruction fetching, and picking unit 44.

A data cache 47 receives the output from various processing units 34 and 36 and provides data over a two-way way bus to a level 2 or L2 cache 48. The L2 cache 48 is coupled by a ring bus 46 to main memory. A clocking (CLX) unit 49 provides clocking signals to the bus between the data cache and the L2 cache and the bus between the L2 cache and the ring bus.

The processor core 30, shown in FIG. 1, is a single instruction multiple data (SIMD) processor. It uses SIMD load/store instructions. Since the operation is based on a SIMD width of 512 bits or sixteen elements, it operates most efficiently if the data is vectored or a aligned so that the starting address of a data structure starts in an address that is a multiple of the SIMD width. Thus, in the example described above, with thirty two vector registers, the SIMD width is sixteen elements or 512 bits. Then it is desirable that the addresses of data structures start at multiples of four, sixteen and, most preferably, sixty four.

Advantageously, the SIMD processor core 30 works with vectored or aligned data. The processor exploits data level parallelism by efficiently utilizing the SIMD hardware to improve performance in some embodiments. Thus, "aligned, vectored" data refers to data structures that are efficient for a parallel SIMD architecture because their starting addresses are multiples of the executing SIMD processor's width. The registers are 512 bit wide SIMD registers in one embodiment.

Figure 2:
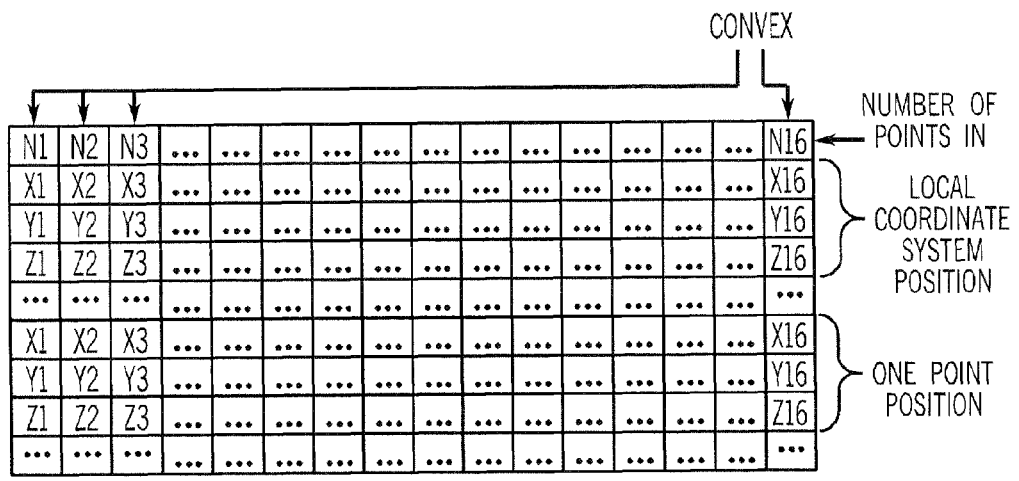
FIG. 2 is a depiction of a data format for use in accordance with one embodiment.

Referring to FIG. 2, a data structure for use in one embodiment, where the SIMD width is 16 elements, is depicted. Of course, other widths may be utilized, but similar principles may be used to align the data to the SIMD width. The data storage structure, shown in FIG. 2, contains the initial separating axes for supporting a mapping function, position and rotation of a local coordinate system, number of points in a convex set, and the position of each point. However, the present invention is not limited to convex shapes represented as a convex hull of vertices sets.

The data structure, shown in FIG. 2, attempts to arrange the necessary information in an aligned, vectored fashion. N, in the first row, refers to the number of vertices in the objects A and B in each column and X, Y, and Z are tuples for the vertex coordinates in three-dimensional space that represent the objects A and B. The X1-X16, Y1-Y16, and Z1-Z16 variables in rows 2, 3, and 4 represent the separating axes, which constitute direction vectors to the local coordinate system. Rows five and up relate to vertices of the sixteen objects. Each vertex is represented using its X, Y, and Z coordinate values. The number of X, Y and Z tuples is the same as the number of vertices in the object. With an SIMD width of sixteen, the data structures are sixteen elements wide in this embodiment.

Figure 3:
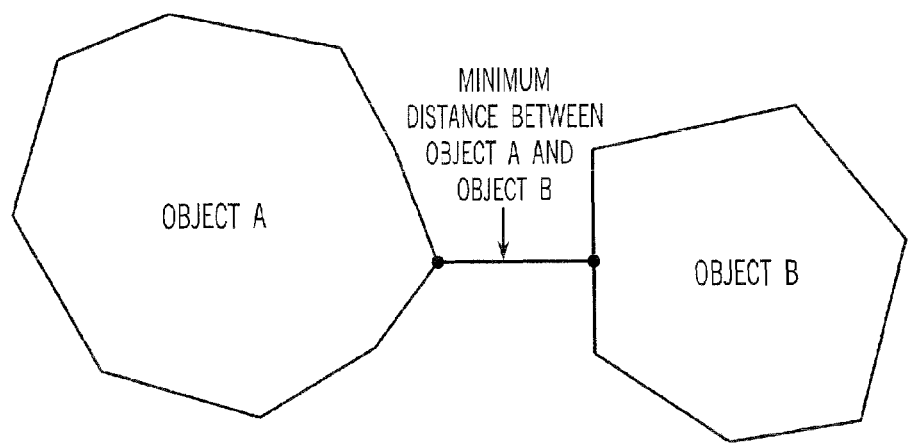
FIG. 3 is a depiction of two objects and the application of the GJK algorithm to those objects.

Referring to FIG. 3, two objects, labeled A and B, are depicted. These objects enclose a convex set (not shown) that may be a more complex structure to define than the objects that are effectively bounding boxes around convex sets. The minimum distance between the object A and the object B is indicated in the figure.

"Convex" refers to the actual shape of the item within the bounds depicted by the objects A and B in FIG. 3. The set of points for each vertex, consisting of X, Y, and Z coordinates, enclose the convex object.

In accordance with some embodiments, the GJK algorithm is adapted to operate on aligned, vectored data suitable for multiple core, parallel processors, such as the one depicted in FIG. 1. In this regard, the data is vectored or aligned with respect to the SIMD width of such a processor.

Figure 4:
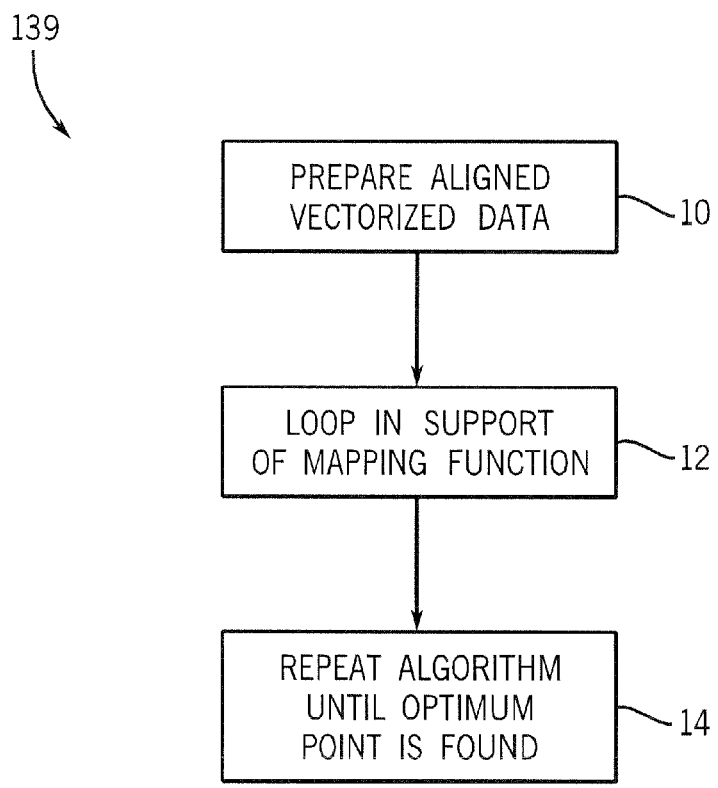
FIG. 4 is a flow chart for one embodiment of the present invention.

The sequence for applying the GJK algorithm, according to one embodiment, is shown in FIG. 4. The sequence 139 may be implemented in software, hardware, or firmware. In a software implemented embodiment, it may be implemented by instructions stored in a computer readable medium, such as a magnetic, optical, or semiconductor storage device. The instructions may be executed by a suitable processor, controller, or computer, including a graphics processor core of a type shown in FIG. 1, or a general purpose processor that includes the ability to operate on multiple threads in parallel using single instruction multiple data architecture.

Thus, as shown at block 10, initially, the aligned, vectored data is prepared. Next, the data is processed using an iterative vectored GJK algorithm to compute the minimum distance between the two objects A and B. The vectored support mapping is implemented in the context of fully vectored GJK implementation. The instructions enable branch avoiding with the help of masked operations. Any "if-else" statement can be expressed as linear code using masked operations in one embodiment.

The vectored GJK algorithm contains only two loops in one embodiment. The first loop, indicated in block 12 supports the mapping function. This loop processes all points in a given set. The second loop, indicated in block 14, repeats the algorithm until the optimum point (i.e. shortest distance between objects) in the algorithm is identified.

The pseudo code for the algorithm uses the Minkowski sum for A and B sets for the objects A and B. Thus, the sum of the two objects results in their combination. Namely, A+B={a+b: a in A, b in B}. The Minkowski difference for A and B sets is a new set: A−B={a−b: a in A, b in B}=A+(−B). CH(S) denotes a convex hull of S vertices.

The input to the algorithm is a convex hull of the Minkowski difference of the sets A and B, which is M. First, an arbitrary simplex Q is chosen from M. Then a point P is computed, closest to the origin in the convex hull of Q vertices. If P is the origin, then exit. In such case, a zero is returned.

Otherwise, Q is reduced to the smallest subset Q' of Q, such that P is in the convex hull of Q' vertices. Then V is equal to the support map computation (Sc) of the furthest vertex along a given direction for −P, which is the supporting point in the direction −P. If V is no more extreme in direction −P, then P itself can exit and return ‖P‖. Next, add V to Q and then go back to computing the point P closest to the origin in the convex hull of Q vertices.

In some embodiments, the vectored approach enables processing pairs of sets employing SIMD units and simultaneously using multi-threaded processor capabilities. A significant performance increase may be achieved in multi-core processors in some embodiments. The greatest performance boost may be achieved by processing sets with the same number of points. In this case, the memory utilization is most effective. For games, this is a most likely estimation because even complex bodies have no more than a few dozen vertices.

Figure 5:
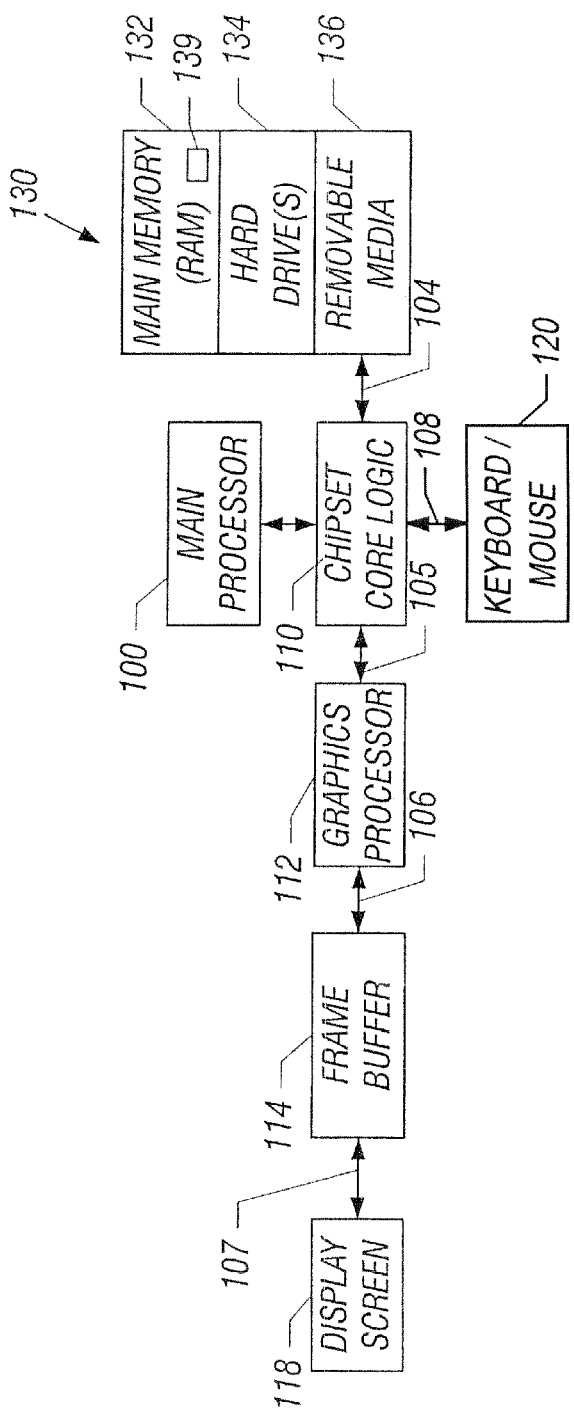
FIG. 5 is a system depiction for one embodiment.

The computer system 130, shown in FIG. 5, may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112, via a bus 105, and the main or host processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using SIMD architecture.

In the case of a software implementation, the pertinent code may be stored in any suitable semiconductor, magnetic, or optical memory, including the main memory 132 or any available memory within the graphics processor. Thus, in one embodiment, the code to perform the sequence 139 of FIG. 4 may be stored in a machine or computer readable medium, such as the memory 132 or the graphics processor 112, and may be executed by the processor 100 or the graphics processor 112 in one embodiment. In one embodiment, the core 30 is part of the graphics processor 112.

The techniques described herein apply to any convex object, including two, three, and higher dimensional surfaces. While a linear time algorithm is used to calculate the support map in the embodiment described above, other algorithms may also be used.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
using an aligned, vectored data structure in a Gilbert-Johnson-Keerthi algorithm run on a processor, said structure including separating axes, position and rotation of a local coordinate system and a position of each point in a convex set; and
implementing said Gilbert-Johnson-Keerthi algorithm in only two loops, wherein the first loop supports a mapping function and processes all points in a given set and the second loop repeats the algorithm until an optimum point for a shortest distance between two objects is identified.

2. The method of claim 1 including using a single instruction multiple data processor.

3. The method of claim 2 including aligning the data structure to the single instruction multiple data processor width.

4. The method of claim 3 including arranging the data structure in a matrix with a first row including a number of vertices, a second, third, and fourth rows indicating separating axes, and remaining rows indicating vertices of a number of objects equal to the single instruction multiple data width.

5. The method of claim 1 including executing a first loop in support of a mapping function.

6. The method of claim 1 including repeating the application of the algorithm until an optimum point is found.

7. The method of claim 1 including running said algorithm on a multi-core parallel processor.

8. The method of claim 7 wherein said processor is a discrete graphics processor.

9. A non-transitory computer readable medium storing instructions to cause a computer to:
use an aligned, vectored data structure in a Gilbert-Johnson-Keerthi algorithm, said structure including separating axes, position and rotation of a local coordinate system and a position of each point in a convex set; and
implement said Gilbert-Johnson-Keerthi algorithm in only two loops, wherein the first loop supports a mapping function and processes all points in a given set and the second loop repeats the algorithm until an optimum point for a shortest distance between two objects is identified.

10. The medium of claim 9 further storing instructions run on a single instruction multiple data processor.

11. The medium of claim 10 further storing instructions to align the data structure to a single instruction multiple data processor width.

12. The medium of claim 11 further storing instructions to arrange the data structure in a matrix with a first row including a number of vertices, a second, third, and fourth rows including separating axes and remaining rows indicating vertices of a number of objects equal to the single instruction multiple data width.

13. The medium of claim 9 further storing instructions to execute a first loop in support of a mapping function.

14. The medium of claim 9 further storing instructions to repeat the application of the algorithm until an optimum point is found.

15. An apparatus comprising:
a single instruction multiple data processor to use an aligned, vectored data structure in a Gilbert-Johnson-Keerthi algorithm, said structure including separating axes, position and rotation of a local coordinate system and a position of each point in a convex set, implement said Gilbert-Johnson-Keerthi algorithm in only two loops, wherein the first loop supports a mapping function and processes all points in a given set and the second loop repeats the algorithm until an optimum point for a shortest distance between two objects is identified; and
a storage coupled to said processor.

16. The apparatus of claim 15 wherein said processor is a multi-core parallel processor.

17. The apparatus of claim 15, said processor to execute a first loop in support of a mapping function.

18. The apparatus of claim 17, said processor to repeat the application of the algorithm until an optimum point is found.

19. The apparatus of claim 15, said processor to arrange the data structure in a matrix with a first row including a number of vertices, a second, third and fourth rows indicating separating axes.

20. The apparatus of claim 15, said processor to arrange the data structure in a matrix with remaining rows indicating vertices of a number of objects equal to the single instruction multiple data width of said processor.

* * * * *